March 15, 1966     O. STOYE     3,241,050
IGNITION SYSTEM ROTARY DISTRIBUTOR
Filed Jan. 29, 1962     2 Sheets-Sheet 1
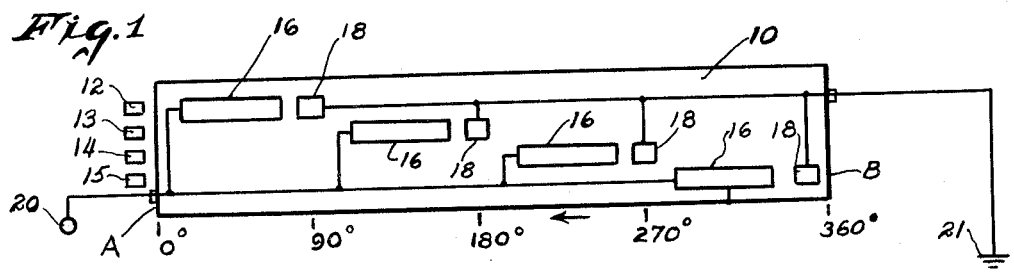
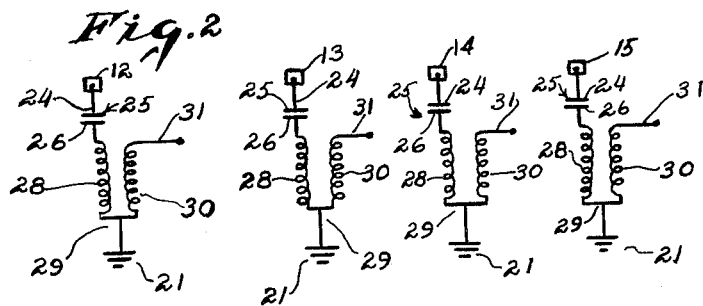
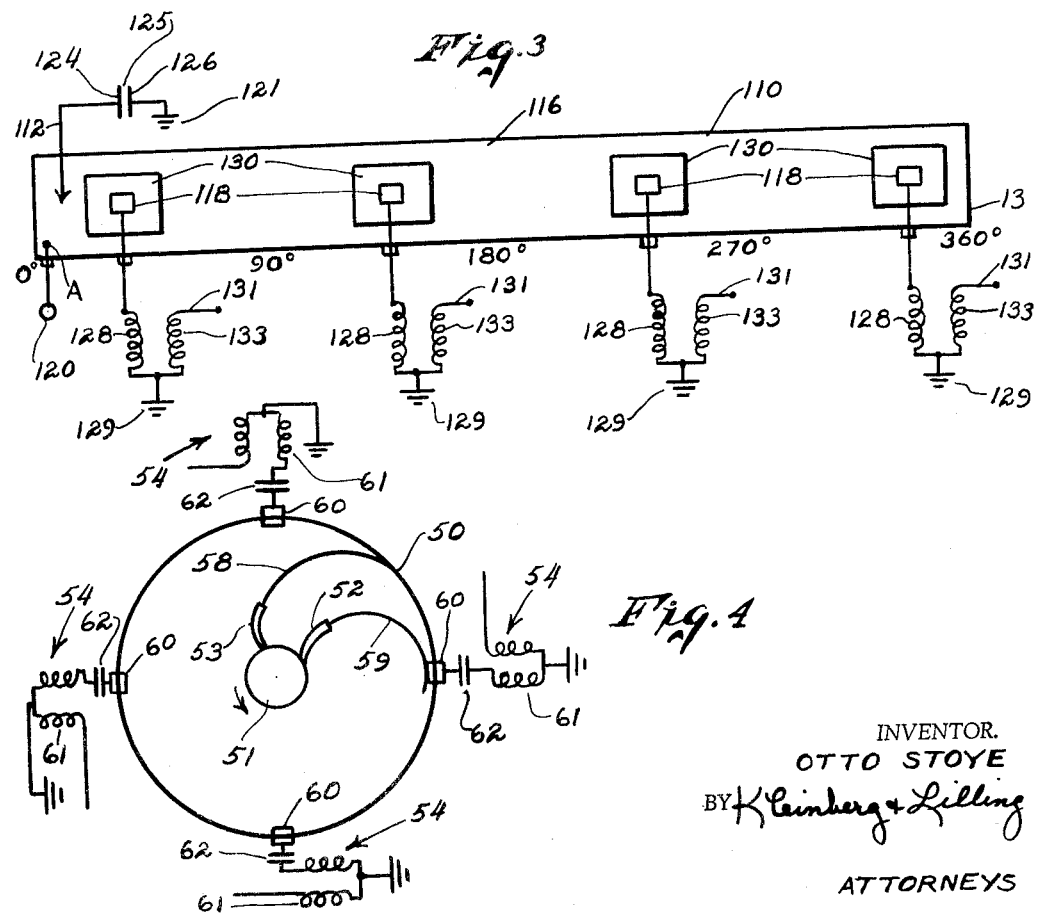
INVENTOR.
OTTO STOYE
BY Kleinberg & Lilling
ATTORNEYS March 15, 1966        O. STOYE        3,241,050

IGNITION SYSTEM ROTARY DISTRIBUTOR

Filed Jan. 29, 1962        2 Sheets-Sheet 2

INVENTOR.
OTTO STOYE
BY Kleinberg & Lilling

ATTORNEYS

United States Patent Office 3,241,050
Patented Mar. 15, 1966

3,241,050
IGNITION SYSTEM ROTARY DISTRIBUTOR
Otto Stoye, 91 Rockaway Ave., Rockville Centre, N.Y.
Filed Jan. 29, 1962, Ser. No. 169,331
8 Claims. (Cl. 323—58)

This invention is generally in the electrical distributor art; more specifically it presents a new and improved rotary electrical distributor; and especially describes an electrical rotary distributor of the capacitor discharge type that will be suitable for use in conjunction with internal combustion engines.

As is well known, it is necessary to ignite the charge of internal combustion engines by the utilization of a high-tension spark across a short fixed gap in the combustion chamber or cylinder. The flow of electrons during the electrical discharge activates and ignites the mixture in the path of the discharge and the combustion process is started. Of course, as will be apparent, the intensity, uniformity and timing of the spark will have much to do with the operation and efficiency of the engine.

The usual source of energy for a high-tension ignition system is an electric generator, battery, or magneto. The generator and battery supply direct current at 6 or 12 volts potential, while the magneto supplies alternating current with peak voltages somewhat higher. Regardless of energy source, the high-tension ignition system has a primary circuit for the low-voltage current and a secondary circuit for the high-voltage current.

The primary circuit consists of a battery, ammeter, switch, primary coil winding, breaker points, and condenser. Closing the ignition switch and the breaker points causes the current to flow through the primary circuit and builds up a magnetic field which extends through and around the soft-iron coil core. A cam, driven usually at half engine speed, opens the breaker points and also permits them to close.

The breaking of the primary circuit, by the opening of the breaker points, causes the magnetic field to start to collapse. The collapsing magnetic field induces current which continues to flow in the same direction in the primary circuit and charges the condenser plates. The condenser builds up a potential opposing flow and soon discharges back through the primary circuit. This causes a sudden collapse of the remaining magnetic field, and a high voltage is induced in the secondary coil winding which is also cut by the collapsing magnetic field.

Of course there are several inherent disadvantages in the usual circuit above-described. The system puts a momentary short across the power supply during the period of condenser discharge. This results in an undue load on the system and further, delays build-up of the potential for the next charge. Furthermore, breaker points are subject to frequent failures and will often pit or otherwise become inoperative because of dirt, etc. Additionally, there are practical limits to the high voltage systems, that may be produced by such systems.

It is a primary object of this invention, therefore, to provide a more efficient and durable electric distributor without breaker plates or the like.

Another cardinal object hereof is to describe a distributor for internal combustion engines that will more uniformly produce a high-tension electrical discharge.

Another object and accomplishment hereof is to set forth an ignition system for internal combustion engines that will require a smaller power supply.

Still another object hereof is to describe an electrical distributor that may be relatively easily mass-produced.

Still another purpose of this invention is to describe an ignition system with relatively few working parts.

Still another object of this device is to describe a condenser discharge type distributor that will be capable of producing relatively high discharge voltages.

With these objects in vew, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is a developed view of one embodiment of the instant invention with the parts thereof illustrated primarily diagrammatically.

FIG. 2 is a schematic view of a portion of the remainder of the electrical circuit of the embodiment of the device illustrated in FIG. 1.

FIG. 3 is a developed view of a second alternate embodiment of the instant invention with the parts again illustrated primarily diagrammatically.

FIG. 4 is a diagrammatic representation of the third embodiment of the device.

Figure 5:
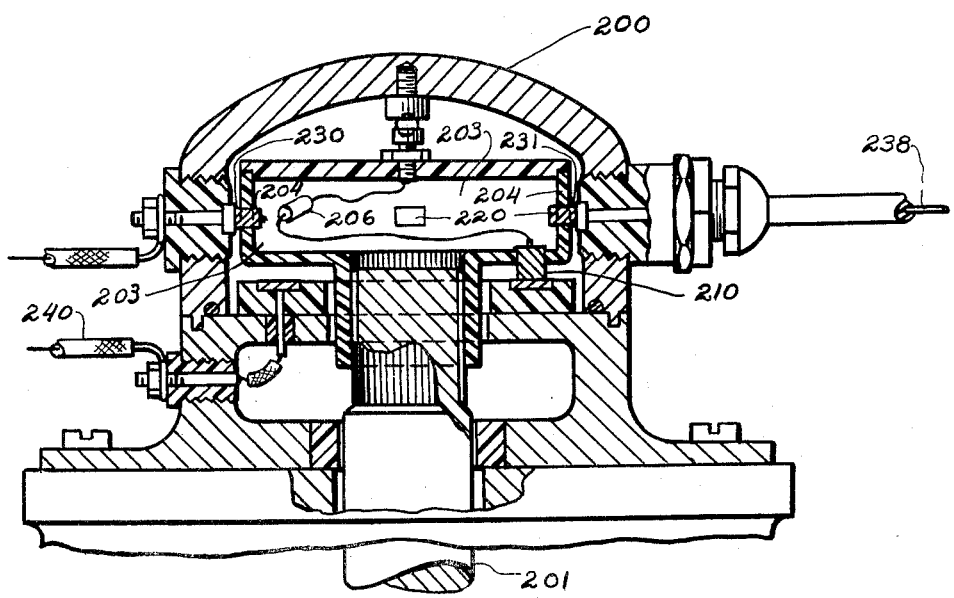
FIG. 5 is a side elevational sectional view taken substantially through the center of a fourth embodiment of this device.

Referring particularly to FIG. 1 and FIG. 2 of the drawings, it is to be observed that these are developed and primarily diagrammatic. FIG. 1 illustrates a strip 10 which will generally be wrapped around a rotating cylinder. Thus, points A and B will be touching when installed on the said cylinder and the remaining points of the strip will be located substantially as marked (90, 180, 270 degrees, etc.).

As will be described in greater detail below, the said cylinder will be suitably connected to the crank shaft of the engine and will, therefore, rotate in direct proportion to the engine speed. Slip ring points 12, 13, 14 and 15 will be provided to pass over and make contact with the surface of the strip 10 as the said strip moves relative thereto.

Assuming that the engine is equipped with four cylinders or the like, the strip 10 will be provided with four sets of contact points. Each of the said sets will be comprised of a relatively long electrical charging plate 16 and a relatively short discharge plate 18. Each of the said charging plates 16 will be electrically connected to one of the terminals 20 of the low voltage output power supply by the utilization of any of the well known conventional slip rings. Correspondingly, each of the discharge plates 18 will be electrically connected by a suitable slip ring, or the like, to the other terminal of the low voltage power supply source. Four diagrammatic purposes, as is usual, this said other terminal is illustrated in the drawings as being the ground 21.

Referring now more particularly to FIG. 1, each of the slip ring points 12, 13, 14 and 15 are in alignment with one of the sets of charge and discharge plates 16 and 18. As the strip 10 rotates, therefore, each of the said pair of plates will come into contact with one of the slip ring points 12, 13, 14 or 15. In that the said slip ring 10 will move relative to the said slip ring points, 12, 13, 14 and 15 in the direction of the arrow (due to its rotation), each of the said points will, in turn, first contact the charging plate 16 and then will contact a discharge plate 18 immediately thereafter.

A portion of the electrical circuit of this embodiment of the device is illustrated in FIG. 2. Electrically connected to each of the slip ring points 12, 13, 14 and 15 and will be one of the plates 24 of a capacitor 25. The opposite plate 26 will be electrically connected to the low voltage coil 28 of a high voltage transformer 29. The high voltage coil 30 of this transformer will in turn be connected by a suitable transmission line 31 to the combustion chamber spark plug or the like (not illustrated).

The operation of this simplified embodiment of the device will now be apparent. As the slip ring point 12 contacts its charging plate 16, it will be electrically connected to one of the terminals 20 of the low voltage power supply source. This will complete an electrical circuit to the other terminal of the power supply source or ground 21 through capacitor 25 and low voltage coil 28. This will cause a charge or potential to be impressed across the plates 24 and 26 of the said capacitor 25. In that the slip ring point 12 will contact the charging plate 16 for some period of time due to the elongated length of the said charge plate 16, the potential across the plates 24 and 26 will have sufficient opportunity to build up to a maximum. As the rotation or the relative movement of the strip 10 continues, the slip ring point 12 will continue past the charging plate 16. The capacitor 25, however, will maintain its charge or impressed potential in that the strip 10 will be of an insulating material and will thus prohibit the flow of current from the capacitor 25 and reduce electrical leakage to a minimum. Immediately thereafter, the slip ring point 12 will contact a discharge plate 18. Immediately, the potential across the capacitor 25 will be reduced from a maximum to zero. As previously mentioned, and as in the conventional apparatus, this will cause the magnetic field which will extend about the core of the low voltage coil 28 of the transformer 29 to suddenly collapse, causing a high voltage to be induced in the secondary or high voltage coil 30 of the said transformer. This high voltage will in turn cause a spark to be generated across the gap in the usual spark plug.

This same operation above-described will be repeated in turn for each of the sets of slip ring points 12, 13, 14 and 15 and their corresponding charging and discharging plates 16 and 18.

Thus, it will be apparent that this first embodiment of the invention will accomplish the objects previously set forth. It is to be especially noted that the capacitor 25 and transformer 29 will not be electrically connected to the power supply source during the period of discharge. This will effectively prevent any shorting condition across the power supply. Furthermore, the usual breaker points along with their many inherent weaknesses and failures are eliminated. It will be apparent, however, that many embodiments carrying out the principle of the inventive concept herein may be constructed.

For example, there is shown in FIG. 3 a different diagrammatic embodiment of the device, eliminating the necessity for multiple capacitors. As will be observed therein, each of the transformers 129 will be electrically connected by suitable slip rings to one of the discharge plates 118. Additionally, in this embodiment, the surface of the rotating strip 110 (which again is wrapped around a rotating cylinder) will be mostly covered with a conductive material which will comprise the charging plate 116 connected to one of the terminals of the low voltage power supply source 120.

In place of the plurality of slip ring points described in the previous embodiment, there will be utilized herein one slip ring point 112 electrically connected to one of the plates 124 of a capacitor 125. The opposite plate 126 of the capacitor 125 will be electrically connected to ground 121.

The workings of this second embodiment will now be apparent. As the strip 110 rotates, the slip ring point 112 will contact the charging plate 116, thereby causing a potential to be impressed across the plates of the capacitor 125. As the strip 110 continues its rotation, however, the slip ring point 112 will pass over an insulating section 130 and will contact one of the discharge plates 118. Upon contact with a discharge plate 118, the potential across the capacitor 125 will be reduced from a maximum to a minimum in an extremely short period of time. This will, in turn, cause a rapid buildup of the magnetic field surrounding the primary or low voltage coil 128 of the transformer 129 further resulting in an extremely high and sudden buildup of voltage in the secondary or high voltage coil 133 of the said transformer. The said high voltage will be conducted to the conventional spark plug or the like, by transmission lines 131.

As strip 110 continues its rotation, this same effect will be obtained through each of the discharge points 118 and, therefore, in each of the transformers 129.

Thus, it will be seen then that this second embodiment of the invention accomplishes the objects previously set forth as with the first embodiment, but eliminates the necessity for multiple capacitors. Only one capacitor 125 will be necessary to carry out the functions of the workings herein shown. Additionally, the necessity for a plurality of individual charging plates is eliminated in that the major area of the surfaces of the rotating slip 110 will comprise one relatively large charging plate.

Of course, it will be noted that many specific structures carrying out the broad inventive concepts of this device may be constructed. There will be briefly described below the overall construction of two typical structures for exemplary purposes.

Referring particularly to FIG. 4, which is a sectional view, it will be seen that this device may be constructed primarily of a housing 50, a rotary assembly 51, contact arms 52 and 53 and a plurality of capacitor-transformer circuits 54.

The rotor assembly 51 will be connected to the engine crank shaft and will, therefore, rotate in direct proportion to the engine speed. Rigidly fixed to the said rotor assembly 51 and extending outwardly therefrom will be the contact arms 52 and 53. Each of the said contact arms 52 and 53 will be constructed of a substantially rigid electrically conducting material but will have relatively flexible conducting end portions 58 and 59. The portions 58 and 59 will be constructed of such length as to be always compressed and rigid against the outward walls of the housing 50, making continuous contact therewith. Imbedded in the said housing 50 will be a plurality of discharge plates 60; one such discharge plate for each of the cylinders or the like of the engine. The discharge plates 60 will be connected to the primary of the transformer 61 across the plates of a capacitor 62.

The first of the said contact arms 53 will be electrically connected by a suitable slip ring located for example, above the rotor 51 to one of the terminals of the low voltage power supply. The other of the said contact arms 52 will be connected by a suitable slip ring assembly below the rotor 51 to the other terminal or ground. The operation of this embodiment may now be explained.

The rotor assembly 51 rotates in direct proportion to the engine speed. As it rotates, it causes the contact arms 52 and 53 to correspondingly rotate. During the course of each cycle of the rotation, the end portion 58 of the first contact arm 53 will contact each of the discharge plates 60. In that the said arm is electrically connected to the low voltage output of the power supply, it will cause a charge to be impressed across the terminals of the capacitor 62. In that the end portion 58 is relatively long, there will be a sufficient period of contact to cause the impressed voltage to reach a maximum. As the rotor 51 continues its rotation, however, the arm 53 will leave the particular discharge plate 60. Immediately thereafter the end portion 59 of the said contact assembly 52 will contact the discharge plate 60. In that, as previously mentioned, the said contact arm 52 is connected to ground, it will cause the capacitor 62 previously charged, to discharge through the plate 60. As in the prior embodiments, this will cause a rapid collapse in the magnetic field surrounding the primary coil of the transformer 61 and a correspondingly rapid buildup of an extremely high voltage in the secondary of the said transformer. This secondary high voltage will, as before, be conducted to the engine spark plugs.

Figure 6:
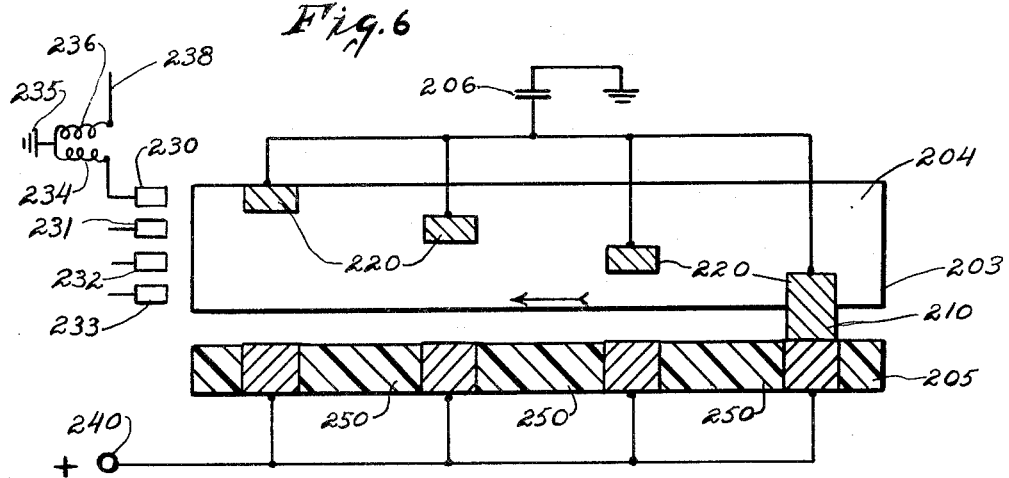
FIG. 6 is a schematic representation of the embodiment of the invention illustrated in FIG. 5.

There is illustrated in FIG. 5 an additional embodiment of this device. The workings of this embodiment of the device is illustrated diagrammatically in FIG. 6.

It will be noted that essentially this embodiment is comprised of a housing 200, a rotating shaft 201 connected to the engine crank shaft and a rotor assembly 203. The rotor assembly 203 will have a strip 204 around its outer periphery and stationary conducting strip 205 directly below. Contained within the rotor assembly 203 will be a capacitor 206. The capacitor 206 will be electrically connected to conducting portions 220 of the strip 204 and a slip ring 210 below the rotor assembly 203.

Spaced about the inner periphery of the housing 200 will be four contact points 230, 231, 232 and 233. The said contact points will each be vertically positioned so as to contact only one of the conducting plates 220 during a revolution of the rotor assembly 203. Each of the contact points 230, 231, 232 and 233 will be connected to the primary 234 of a transformer 235. The secondary 236 of the said transformer will each be conducted to an engine spark plug 238 not illustrated. The stationary conducting strip 205 located directly below the rotor assembly 203 will be comprised of an electrically conducting material except for four equi-spaced portions which will be coated with an insulating material. The conducting portion of the stationary assembly 205 will be electrically connected to the low voltage terminal of the power supply 240.

Thus, the workings of this embodiment of the invention may now be set forth. The rotor assembly 203 with a capacitor 206 therewithin always connected to ground, constantly rotates in direct proportion to the engine speed. The other terminal of the said capacitor 206 is connected to each of the plates 220 and further, to the lower slip ring 210. So long as the slip ring 210 contacts one of the portions of the stationary conducting strip 205, it will cause a charge to be impressed across the capacitor 206. At the same time that the slip ring 210 reaches one of the insulated portions 250 of the stationary assembly 205, one of the contact points 230, 231, 232, or 233 will contact one of the plates 220. This will cause the previously charged capacitor 206 to discharge through the plate 220 the contact points 230, 231, 232 and 233 and the primary of the transformer 234. As in the previous embodiments, an extremely high electromotive-force will be generated in the secondary of the transformer and conducted to the spark plug through line 238.

Of course, as many embodiments of the inventive concept herein disclosed may be constructed as desired. The invention, however, will, in all cases, consist essentially of the combination of a rotary distributor with the advantages of capacitor discharge. The advantages of such a structure was previously set forth, but others will be apparent to those skilled in the art.

Of course, during this specification, reference has been made in most instances to an assembly with four points of discharge. This number was selected merely for ease of explanation, but in all cases, any number of points of discharge may be selected. Furthermore, it will, of course, be possible to stack one or more of the rotors as desired on any embodiments for the purpose of multiplying the number of discharge points without any substantial interference and to insure enough time for the build-up of voltage across the capacitor. Of course it will be realized, that the capacitor discharge system employed herein will be capable of producing extremely high voltages.

It is further contemplated herein that the transformer utilized to build up the high tension may be constructed integrally with the spark plug or the like. This will alleviate the necessity of transmitting the high voltage current. The only transmission wires necessary will be those sufficient to carry out the normal output of the power supply.

Furthermore, although not mentioned or specifically shown therein, any of the methods of altering the timing of the discharge in proportion to engine speed or the like, may be utilized herewith.

Additionally, it is contemplated by the inventor that the embodiments of the invention herein disclosed may be constructed relatively economically by the utilization of the conventional printed circuitry of both the rotor assembly and portions of the slip ring assembly.

While there are above disclosed but a limited number of embodiments of the structure and product of the invention herein presented it is possible to produce still other embodiments without departing from the inventive concept herein disclosed, and it is desired, therefore, that only such limitations be imposed on the appended claims as are stated therein, or required by the prior art.

Having thus described my invention and illustrated its use, what I claim as new and desire to secure by Letters Patent is:

1. A distributor for the circuit of an ignition system including a first member having at least one electrical charging plate and at least one electrical discharging plate, and at least one contact member being electrically connected to one side of a capacitor, and means to move said first member and said contact member relative to each other whereby said contact member and said capacitor will alternately be in contact with said electrical charging plate and receive an electrical charge and then be in contact with said electrical discharge plate to release said electrical charge.

2. A distributor for the circuit of an ignition system including an elongated strip, a first portion of said elongated strip being electrically conductive and adapted for electrical connection, and a plurality of second portions on said elongated strip being adapted for opposite electrical connection, said first and said second portions of said elongated strip being separated by insulating material, and contact points alternately contacting said first portion whereby said contact points will be connected to one electrical connection and then contacting one of said second portions whereby said contact will be electrically connected to another electrical connection, and means electrically connecting each of said contact points to a capacitor.

3. A distributor for the circuit of an ignition system as set forth in claim 2, further including a high voltage transformer, said capacitor being electrically connected to the low voltage input of said transformer.

4. A distributor for the circuit of an ignition system as set forth in claim 3, further including means to move said elongated strip relative to said contact points.

5. A distributor for the circuit of an ignition system as set forth in claim 4, further including first slip ring means electrically connecting one terminal of a power supply to said first portion of said elongated strip.

6. A distributor for the circuit of an ignition system as set forth in claim 5, further including second slip ring means electrically connecting said other terminal of said power supply to said plurality of second portions.

7. A distributor for the circuit of an ignition system as described in claim 6, wherein said elongated strip is disposed on a rotating member, and said contact points are disposed in a spaced relationship on a housing surrounding said rotating member.

8. A distributor for the circuit of an ignition system including a first member having at least one electrical charging plate and at least one electrical discharging plate, said electrical charging plate and said electrical discharging plate being separated by a gap of non-conducting material, and at least one contact member being electrically connected to one side of a capacitor, and means to move said first member and said contact member relative to each other whereby said contact member and said capacitor will alternately be in contact with said electrical charging plate and receive an electrical charge and then be in contact with said electrical discharge plate to release said electrical charge after said contact is separated from said electrical charging plate, and means to rotate said first member relative to said contact member.

References Cited by the Examiner

UNITED STATES PATENTS 2,662,202  12/1953  Short _____ 315—214
2,997,552  8/1961  Silverschotz _____ 200—24

LLOYD McCOLLUM, *Primary Examiner.*